US011016836B2

(12) United States Patent
Johnston et al.

(10) Patent No.: US 11,016,836 B2
(45) Date of Patent: May 25, 2021

(54) GRAPHICAL USER INTERFACE FOR VISUALIZING A PLURALITY OF ISSUES WITH AN INFRASTRUCTURE

(71) Applicant: Cisco Technology, Inc., San Jose, CA (US)

(72) Inventors: Jay Kemper Johnston, Raleigh, NC (US); Magnus Mortensen, Cary, NC (US); David C. White, Jr., St. Petersburg, FL (US); Joseph Michael Clarke, Raleigh, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 18 days.

(21) Appl. No.: 16/514,340

(22) Filed: Jul. 17, 2019

(65) Prior Publication Data

US 2019/0340056 A1    Nov. 7, 2019

Related U.S. Application Data

(63) Continuation of application No. 15/358,426, filed on Nov. 22, 2016, now Pat. No. 10,372,520.

(51) Int. Cl.
*G06F 11/00* (2006.01)
*G06F 11/07* (2006.01)
*H04L 12/24* (2006.01)

(52) U.S. Cl.
CPC ...... *G06F 11/0769* (2013.01); *G06F 11/0721* (2013.01); *H04L 41/22* (2013.01)

(58) Field of Classification Search
CPC ............. G06F 11/0766; G06F 11/0769; H04L 41/0659; H04L 41/0663; H04L 41/22
See application file for complete search history.

(56) References Cited

U.S. PATENT DOCUMENTS 5,625,763 A    4/1997   Cirne
6,330,231 B1   12/2001  Bi
(Continued)

FOREIGN PATENT DOCUMENTS

GB    2 389 017 A    11/2003
JP    2011-204656    10/2011
WO    2013163432     10/2013

OTHER PUBLICATIONS

IEEE Standard Glossary of Computer Hardware Terminology, 1995, The Institute of Electrical and Electronics Engineers, Inc., IEEE Std 610.10-1994, pp. 1 and 56 (Year: 1995).*
(Continued)

*Primary Examiner* — Michael Maskulinski
(74) *Attorney, Agent, or Firm* — Polsinelli PC

(57) ABSTRACT

Disclosed are systems, methods and non-transitory computer-readable mediums for dynamically presenting and updating a directed time graph displayed in a graphical user interface. In some examples, the method can include displaying a suggested path within a graphical user interface on a computer screen, the suggested path can include outstanding issues of elements of a network. The displaying the suggested path can include determining based on one or more factors an efficient ordering of the outstanding issues and ordering the outstanding issues based on the one or more factors. The method can also include monitoring, at regular intervals, updates to the one or more outstanding issues and automatically updating the suggested path, by a processor, based on the updates to the one or more outstanding issues.

20 Claims, 9 Drawing Sheets

(56) References Cited

U.S. PATENT DOCUMENTS

| | | |
|---|---|---|
| 6,363,421 B2 | 3/2002 | Barker et al. |
| 6,415,164 B1 | 7/2002 | Blanchard et al. |
| 6,453,345 B2 | 9/2002 | Trcka et al. |
| 6,470,383 B1 | 10/2002 | Leshem et al. |
| 6,484,261 B1 | 11/2002 | Wiegel |
| 6,529,218 B2 | 3/2003 | Ogawa et al. |
| 7,027,052 B1 | 4/2006 | Thorn et al. |
| 7,036,087 B1 | 4/2006 | Odom |
| 7,043,702 B2 | 5/2006 | Chi et al. |
| 7,051,029 B1 | 5/2006 | Fayyad et al. |
| 7,603,373 B2 | 10/2009 | Error et al. |
| 7,616,579 B2 * | 11/2009 | Slattery ............... H04L 41/5035 370/241 |
| 7,644,365 B2 | 1/2010 | Bhattacharya et al. |
| 7,730,223 B1 | 6/2010 | Bavor et al. |
| 7,792,844 B2 | 9/2010 | Error et al. |
| 7,861,175 B2 | 12/2010 | Wormald et al. |
| 7,921,459 B2 | 4/2011 | Houston et al. |
| 7,945,620 B2 | 5/2011 | Bou-Ghannam et al. |
| 7,958,189 B2 | 6/2011 | Bernstein |
| 8,006,198 B2 | 8/2011 | Okuma et al. |
| 8,037,421 B2 | 10/2011 | Scott et al. |
| 8,140,991 B2 | 3/2012 | Smith et al. |
| 8,245,297 B2 | 8/2012 | Lim |
| 8,325,626 B2 | 12/2012 | Tóth et al. |
| 8,380,359 B2 | 2/2013 | Duchene et al. |
| 8,396,874 B2 | 3/2013 | Shamma et al. |
| 8,402,384 B2 | 3/2013 | Scott |
| 8,423,163 B2 | 4/2013 | Park |
| 8,429,562 B2 | 4/2013 | Gourdol et al. |
| 8,442,693 B2 | 5/2013 | Mirza et al. |
| 8,443,289 B2 | 5/2013 | Sahashi et al. |
| 8,448,076 B2 | 5/2013 | Hammack et al. |
| 8,601,375 B2 | 12/2013 | von Eicken et al. |
| 8,619,958 B2 | 12/2013 | Patisaul et al. |
| 8,650,492 B1 | 2/2014 | Mui et al. |
| 8,738,158 B2 | 5/2014 | Sims et al. |
| 8,762,475 B2 | 6/2014 | Cheung et al. |
| 8,839,404 B2 | 9/2014 | Li et al. |
| 8,850,344 B1 | 9/2014 | Rowlette |
| 8,868,736 B2 | 10/2014 | Bowler et al. |
| 8,958,318 B1 | 2/2015 | Hastwell et al. |
| 8,972,893 B2 | 3/2015 | Duncan et al. |
| 8,977,794 B2 | 3/2015 | Grohman et al. |
| 8,994,539 B2 | 3/2015 | Grohman et al. |
| 9,112,719 B2 | 8/2015 | Sasaki et al. |
| 9,185,002 B2 | 11/2015 | Sasaki et al. |
| 9,317,778 B2 | 4/2016 | Cordova-Diba et al. |
| 9,318,016 B2 | 4/2016 | Park |
| 9,354,798 B2 | 5/2016 | Sasaki et al. |
| 9,462,041 B1 | 10/2016 | Hagins et al. |
| 9,467,848 B1 | 10/2016 | Song et al. |
| 9,516,374 B2 | 12/2016 | Cormican et al. |
| 9,553,948 B2 | 1/2017 | Wong et al. |
| 9,584,853 B2 | 2/2017 | Frebourg et al. |
| 9,674,275 B1 | 6/2017 | Engers et al. |
| 9,686,581 B2 | 6/2017 | Cormican et al. |
| 9,733,983 B2 | 8/2017 | Kukreja et al. |
| 9,781,008 B1 | 10/2017 | Notari et al. |
| 9,900,224 B2 | 2/2018 | Dumitriu et al. |
| 9,985,837 B2 | 5/2018 | Rao et al. |
| 10,164,861 B2 | 12/2018 | Hughes et al. |
| 10,873,850 B2 * | 12/2020 | Hurst ................. G06F 11/0748 |
| 2001/0048373 A1 | 12/2001 | Sandelman |
| 2002/0049749 A1 | 4/2002 | Helgeson et al. |
| 2002/0087976 A1 | 7/2002 | Kaplan et al. |
| 2003/0035075 A1 | 2/2003 | Butler et al. |
| 2003/0229529 A1 | 12/2003 | Mui et al. |
| 2004/0010561 A1 | 1/2004 | Kim et al. |
| 2004/0034614 A1 | 2/2004 | Asher et al. |
| 2004/0041833 A1 | 3/2004 | Dikhit |
| 2004/0236774 A1 | 11/2004 | Baird et al. |
| 2005/0146534 A1 | 7/2005 | Fong et al. |
| 2006/0005228 A1 | 1/2006 | Matsuda |
| 2006/0123393 A1 | 6/2006 | Atkins et al. |
| 2006/0129939 A1 | 6/2006 | Nelles et al. |
| 2007/0037563 A1 | 2/2007 | Yang et al. |
| 2007/0061486 A1 | 3/2007 | Trinh et al. |
| 2007/0226325 A1 | 9/2007 | Bawa et al. |
| 2007/0239854 A1 | 10/2007 | Janakiraman et al. |
| 2008/0045142 A1 | 2/2008 | Kim |
| 2008/0084888 A1 | 4/2008 | Yadav et al. |
| 2008/0101381 A1 | 5/2008 | Sun et al. |
| 2008/0126930 A1 | 5/2008 | Scott |
| 2008/0127057 A1 | 5/2008 | Costa et al. |
| 2008/0163207 A1 | 7/2008 | Reumann et al. |
| 2008/0165136 A1 | 7/2008 | Christie et al. |
| 2008/0168404 A1 | 7/2008 | Ording |
| 2008/0209005 A1 | 8/2008 | Akamatsu et al. |
| 2008/0219243 A1 | 9/2008 | Silverman |
| 2008/0307451 A1 | 12/2008 | Green |
| 2009/0044185 A1 | 2/2009 | Krivopaltsev |
| 2009/0113331 A1 | 4/2009 | Smith et al. |
| 2009/0153288 A1 | 6/2009 | Hope et al. |
| 2009/0307485 A1 | 12/2009 | Weniger et al. |
| 2010/0023865 A1 | 1/2010 | Fulker et al. |
| 2010/0031202 A1 | 2/2010 | Morris et al. |
| 2010/0033422 A1 | 2/2010 | Mucignat et al. |
| 2010/0169755 A1 | 7/2010 | Zafar et al. |
| 2010/0174583 A1 | 7/2010 | Passova et al. |
| 2010/0188328 A1 | 7/2010 | Dodge et al. |
| 2010/0218211 A1 | 8/2010 | Herigstad et al. |
| 2010/0262477 A1 | 10/2010 | Hillerbrand et al. |
| 2010/0275139 A1 | 10/2010 | Hammack et al. |
| 2010/0280637 A1 | 11/2010 | Cohn et al. |
| 2010/0333165 A1 | 12/2010 | Basak et al. |
| 2011/0030013 A1 | 2/2011 | Diaz Perez |
| 2011/0050594 A1 | 3/2011 | Kim et al. |
| 2011/0115741 A1 | 5/2011 | Lukas et al. |
| 2011/0142053 A1 | 6/2011 | Van Der Merwe et al. |
| 2011/0179388 A1 | 7/2011 | Fleizach et al. |
| 2011/0182295 A1 | 7/2011 | Singh et al. |
| 2011/0185303 A1 | 7/2011 | Katagi et al. |
| 2011/0191303 A1 | 8/2011 | Kaufman et al. |
| 2011/0193788 A1 | 8/2011 | King et al. |
| 2011/0202270 A1 | 8/2011 | Sharma et al. |
| 2011/0208541 A1 | 8/2011 | Wilson et al. |
| 2011/0209089 A1 | 8/2011 | Hinckley et al. |
| 2011/0209104 A1 | 8/2011 | Hinckley et al. |
| 2011/0221777 A1 | 9/2011 | Ke |
| 2011/0239142 A1 | 9/2011 | Steeves et al. |
| 2011/0264286 A1 | 10/2011 | Park |
| 2011/0289475 A1 | 11/2011 | Sukhenko et al. |
| 2012/0005609 A1 | 1/2012 | Ata et al. |
| 2012/0054367 A1 | 3/2012 | Ramakrishnan et al. |
| 2012/0140255 A1 | 6/2012 | Tanaka |
| 2012/0154138 A1 | 6/2012 | Cohn et al. |
| 2012/0154294 A1 | 6/2012 | Hinckley et al. |
| 2012/0185791 A1 | 7/2012 | Claussen et al. |
| 2012/0185913 A1 | 7/2012 | Martinez et al. |
| 2012/0192111 A1 | 7/2012 | Hsu et al. |
| 2012/0210349 A1 | 8/2012 | Campana et al. |
| 2012/0235921 A1 | 9/2012 | Laubach |
| 2012/0278727 A1 | 11/2012 | Ananthakrishnan et al. |
| 2012/0290940 A1 | 11/2012 | Quine |
| 2012/0291068 A1 | 11/2012 | Khushoo et al. |
| 2012/0324035 A1 | 12/2012 | Cantu et al. |
| 2013/0021281 A1 | 1/2013 | Tse et al. |
| 2013/0024799 A1 | 1/2013 | Fadell et al. |
| 2013/0047125 A1 | 2/2013 | Kangas et al. |
| 2013/0069969 A1 | 3/2013 | Chang et al. |
| 2013/0124523 A1 | 5/2013 | Rogers et al. |
| 2013/0145008 A1 | 6/2013 | Kannan et al. |
| 2013/0145307 A1 | 6/2013 | Kawasaki |
| 2013/0152017 A1 | 6/2013 | Song et al. |
| 2013/0155906 A1 | 6/2013 | Nachum et al. |
| 2013/0159898 A1 | 6/2013 | Knospe et al. |
| 2013/0174191 A1 | 7/2013 | Thompson, Jr. et al. |
| 2013/0179842 A1 | 7/2013 | Deleris et al. |
| 2013/0201215 A1 | 8/2013 | Martellaro et al. |
| 2013/0212287 A1 | 8/2013 | Chappelle et al. |

(56) References Cited

U.S. PATENT DOCUMENTS

| | | |
|---|---|---|
| 2013/0218987 A1 | 8/2013 | Chudge et al. |
| 2013/0265905 A1 | 10/2013 | Filsfils |
| 2013/0290783 A1 | 10/2013 | Bowler et al. |
| 2013/0322438 A1 | 12/2013 | Gospodarek et al. |
| 2013/0322848 A1 | 12/2013 | Li |
| 2013/0326583 A1 | 12/2013 | Freihold et al. |
| 2013/0342637 A1 | 12/2013 | Felkai et al. |
| 2013/0347018 A1 | 12/2013 | Limp et al. |
| 2014/0002580 A1 | 1/2014 | Bear et al. |
| 2014/0007089 A1 | 1/2014 | Bosch et al. |
| 2014/0013271 A1 | 1/2014 | Moore et al. |
| 2014/0016926 A1 | 1/2014 | Soto, IV et al. |
| 2014/0023348 A1 | 1/2014 | O'Kelly et al. |
| 2014/0025770 A1 | 1/2014 | Warfield et al. |
| 2014/0033040 A1 | 1/2014 | Thomas et al. |
| 2014/0040784 A1 | 2/2014 | Behforooz et al. |
| 2014/0089992 A1 | 3/2014 | Varoglu et al. |
| 2014/0105213 A1 | 4/2014 | A K et al. |
| 2014/0108614 A1 | 4/2014 | Gunderson et al. |
| 2014/0108985 A1 | 4/2014 | Scott et al. |
| 2014/0130035 A1 | 5/2014 | Desai et al. |
| 2014/0132594 A1 | 5/2014 | Gharpure et al. |
| 2014/0176479 A1 | 6/2014 | Wardenaar |
| 2014/0181718 A1 | 6/2014 | Gao et al. |
| 2014/0198808 A1 | 7/2014 | Zhou |
| 2014/0201642 A1 | 7/2014 | Vicat-Blanc |
| 2014/0201681 A1 | 7/2014 | Mahaffey et al. |
| 2014/0269321 A1 | 9/2014 | Kamble et al. |
| 2014/0278590 A1 | 9/2014 | Abbassi et al. |
| 2014/0280133 A1 | 9/2014 | Dulitz |
| 2014/0281012 A1 | 9/2014 | Troxler et al. |
| 2014/0282213 A1 | 9/2014 | Musa et al. |
| 2014/0298210 A1 | 10/2014 | Park et al. |
| 2014/0310623 A1 | 10/2014 | O'Connell, Jr. et al. |
| 2014/0320387 A1 | 10/2014 | Eriksson et al. |
| 2014/0337824 A1 | 11/2014 | St. John et al. |
| 2014/0373064 A1 | 12/2014 | Ray |
| 2015/0006296 A1 | 1/2015 | Gupta et al. |
| 2015/0012881 A1 | 1/2015 | Song et al. |
| 2015/0019991 A1 | 1/2015 | Kristjansson Helgi |
| 2015/0030024 A1 | 1/2015 | Venkataswami et al. |
| 2015/0032272 A1 | 1/2015 | Neesen et al. |
| 2015/0043581 A1 | 2/2015 | Devireddy et al. |
| 2015/0058314 A1 | 2/2015 | Leclerc et al. |
| 2015/0074735 A1 | 3/2015 | Herigstad et al. |
| 2015/0081701 A1 | 3/2015 | Lerios et al. |
| 2015/0096011 A1 | 4/2015 | Watt |
| 2015/0113412 A1 | 4/2015 | Peyton et al. |
| 2015/0121436 A1 | 4/2015 | Rango et al. |
| 2015/0128046 A1 | 5/2015 | Cormican et al. |
| 2015/0128050 A1 | 5/2015 | Cormican et al. |
| 2015/0163192 A1 | 6/2015 | Jain et al. |
| 2015/0169208 A1 | 6/2015 | Cho |
| 2015/0193549 A1 | 7/2015 | Frye et al. |
| 2015/0212717 A1 | 7/2015 | Nair et al. |
| 2015/0310645 A1 | 10/2015 | Baumecker |
| 2015/0350448 A1 | 12/2015 | Coffman et al. |
| 2016/0034051 A1 | 2/2016 | Xi et al. |
| 2016/0063954 A1 | 3/2016 | Ryu |
| 2016/0154575 A1 | 6/2016 | Xie et al. |
| 2016/0202879 A1 | 7/2016 | Chen et al. |
| 2016/0217113 A1 | 7/2016 | Bartle et al. |
| 2016/0253046 A1 | 9/2016 | Garrison et al. |
| 2016/0266738 A1 | 9/2016 | Martello |
| 2016/0357829 A1 | 12/2016 | Fung et al. |
| 2016/0364085 A1 | 12/2016 | Henderson et al. |
| 2016/0381023 A1 | 12/2016 | Dulce et al. |
| 2017/0046175 A1 | 2/2017 | Murray et al. |
| 2017/0118308 A1 | 4/2017 | Vigeant et al. |
| 2017/0373935 A1 | 12/2017 | Subramanian et al. |
| 2018/0062876 A1 | 3/2018 | Iizawa et al. |
| 2018/0234310 A1 | 8/2018 | Ingalls et al. |
| 2019/0230003 A1* | 7/2019 | Gao ............... H04L 41/069 |

OTHER PUBLICATIONS

Extended European Search Report from the European Patent Office, dated Mar. 28, 2018, 13 pages, for the corresponding European Patent Application No. 17202013.3.
"AppRF," arubanetworks.com, retrieved Nov. 7, 2017, 12 pages.
"Attractive-jQuery-Circular-Countdown-Timer-Plugin-TimeCircles," Jan. 19, 2015, 1 page.
"Definition of *together*," Merriam-Webster, 2 pages.
"Flow diagram," http://en.wikipedia.org/wiki/Flow_diagram, retrieved on Jun. 11, 2015, 2 pages.
"GitHub," https://github.com/tajas-rane/CLI-forRYU-Firewall retrieved Nov. 9, 2017.
"Google Gesture Search," Goggle, Jun. 21, 2013.
"Introducing the new Sky+ app for iPad," Sky.com, 2 pages.
"SmartView Tiling User Guide," Savant Systems LLC, Jan. 2014, pp. 1-25.
"Suggestion: Browser "new tab" —cover gesture to include bookmarks, " Feb. 11, 2014.
"Tweetbot for MAC," http://tapbots.com/tweetbot/mac retrieved Jun. 8, 2015, 3 pages.
"Y! Multi messenger 2.0.0.100," last update Sep. 10, 2013, http://y-multi-messegar.soft32.com.
"Zeebox is your TV sidekick," Zeebox.com, 2012.
Author Unknown, "Sorting Your Chat List," available at http://support.google.com/chat/answer/161035?hl=en. retrieved on Jan. 1, 2014, 2 pages.
Author Unknown, "User Interface—Changing Icon Appearance Based on Frequency of Use (Samsung)—Patent Application—Prior Art Request," available at http://patents.stackexchange.com/questions/4233/user-interface-changing-icon-appearance-based-on-frequency-of-use-samsung Jul. 26, 2013, 9 pages.
Author Unknown, "Using the Tile View," Visokio, 2013, 3 pages.
Billing, Emily, "Show or hide controls with Rules in Nintex Forms," Version 5, May 25, 2014, 21 pages.
Chemaxon, "Structure Checker," retrieved Sep. 7, 2016 at http://idtarget.rcas.sinica.edu.tw/marvin/help/structurechecker/structurechecker.html 8 pages.
Christian, Josh, "Four Images on One Screen!—Make Your Home Theater More Versatile," DSI Entertainment Systems, Inc., Sep. 2, 2010, 2 pages.
Constine, Josh, "Facebook's Relevance-Filtered Chat buddy List, or, Why Users Don't Know Who's Online," Aug. 8, 2011, 9 pages.
DSI Entertainment Systems, "Creston control of a high-end custom home theater design in Los Angeles," youtube.com, Uploaded on Dec. 14, 2010.
Firewall Builder, http://www.fwbuilder.ord/4.0/screenshots.shtml retrieved Nov. 7, 2017, 4 pages.
Galitz, Wilbert O., "The Essential Guide to User Interface Design," second edition, 2002, p. 477-478.
McNamara, Katherine, "Firepower Setup and Policy Creation," Aug. 12, 2016, 2 pages.
Microsoft Office, "PowerPoint 2013," Quick Start Guide, 2013, 9 pages.
Mui, Phil, "Introducing Flow Visualization: visualizing visitor flow," Google Analytics Blog, Oct. 19, 2011, 6 pages.
National Aeronautics and Space Administration, "GMAT User Guide R2015a," general mission analysis tool, 2015, 368 pages.
Neeman, Patrick, "Goggle is Missing Social and Their Culture May Be to Blame," Jun. 12, 2013, 9 pages.
Pozo, S., et al., "AFPL2, An Abstract Language for Firewall ACLs with NAT support," Jun. 2009, 8 pages.
Residential Systems, Inc "ISE 2014: Savant Systems Displays SmartView Video Tiling Interface," youtube.com, published Feb. 6, 2014.
Residential Systems, Inc., "Savant Video Tiling from Residential Systems, Inc.," youtube.com, posted Dec. 26, 2013.
SAP, "Creating a Catalog," 2014, 4 pages.
SAP, "Creating a Rule Set," 2014, 4 pages.
The Lync Insider, "The "Inside" Perspective on Skype for Business Server 2015, Lync Server 2012, VOIP and Unifie . . . " Jun. 8, 2015, 23 pages.

(56) References Cited

OTHER PUBLICATIONS

Vince, Clear is a iOS to-do app that has the best UI I've seen in a while [VIDEO], Jan. 27, 2012, 15 pages.
Wagner, Kyle, "The OS X Lion Survival Guide," Jul. 21, 2011, 7 pages.
Wikipedia, "Sankey Diagram," Jun. 11, 2015, 2 pages.
Winegar, Mark, "Numbers: adding rows," Dec. 28, 2012, 4 pages.
Yu, Toby, "Resizable Contacts Widget Pro," Oct. 7, 2013, 3 pages.
Zugec, Ivan, "Create Custom Visibility Rules in Panels Using Ctools Access Plugins," Aug. 13, 2015, 12 pages.

\* cited by examiner

```
DISPLAY A SUGGESTED PATH OF OUTSTANDING ISSUES
WITHIN A GRAPHICAL USER INTERFACE
775
          │
          ▼
MONITOR FOR UPDATES OF THE OUTSTANDING ISSUES
780
          │
          ▼
AUTOMATICALLY UPDATE THE SUGGESTED PATH
785
```

FIG. 7B

GRAPHICAL USER INTERFACE FOR VISUALIZING A PLURALITY OF ISSUES WITH AN INFRASTRUCTURE

CROSS-REFERENCE WITH RELATED APPLICATION

The instant application is a Continuation of, and claims priority to U.S. patent application Ser. No. 15/358,426 entitled GRAPHICAL USER INTERFACE FOR VISUALIZING A PLURALITY OF ISSUES WITH AN INFRASTRUCTURE and filed Nov. 22, 2016, the contents of which are incorporated herein by reference in its entirety.

TECHNICAL FIELD

The present disclosure relates to detecting problems on network infrastructures, specifically, determining and visualizing a path for resolving detected problems on the network infrastructures.

BACKGROUND

As network services move from being reactive to proactive, the need to proactively detect issues or problems found with devices in the network infrastructures, and alert the administrator(s) to the detected issues or problems (along with providing suggested solutions) is required.

Some of the issues or problems can be resolved automatically, but others require work to be performed by the administrator(s). Resolving these issues or problems could involve significant work by the administrator(s), including scheduling maintenance windows, checking the proposed solution, implementing the solution and verifying the solution fixed the issue or problem.

Administrator(s) can currently utilize different tools (e.g., Cisco CLI Analyzer, device health check tools, etc.) to detect any known problems, one device at a time. The output from these tools can be a list of problems (e.g., FIG. 1) that have detected on that one device. However, presenting a list of problems will not scale when the service is expanded to run on dozens, hundreds, or thousands of devices within a network infrastructure, resulting in thousands of problems detected. Administrator(s) can become overwhelmed with the resulting problems and trying to decide for themselves which problems to address first.

BRIEF DESCRIPTION OF THE DRAWINGS

The disclosure will be readily understood by the following detailed description in conjunction with the accompanying drawings in which:

FIG. 1 illustrates a graph of a prior art visualization of network devices;

FIGS. 7A and 7B illustrate example methods of determining a directed time graph.

DETAILED DESCRIPTION

Overview

Figure 2:
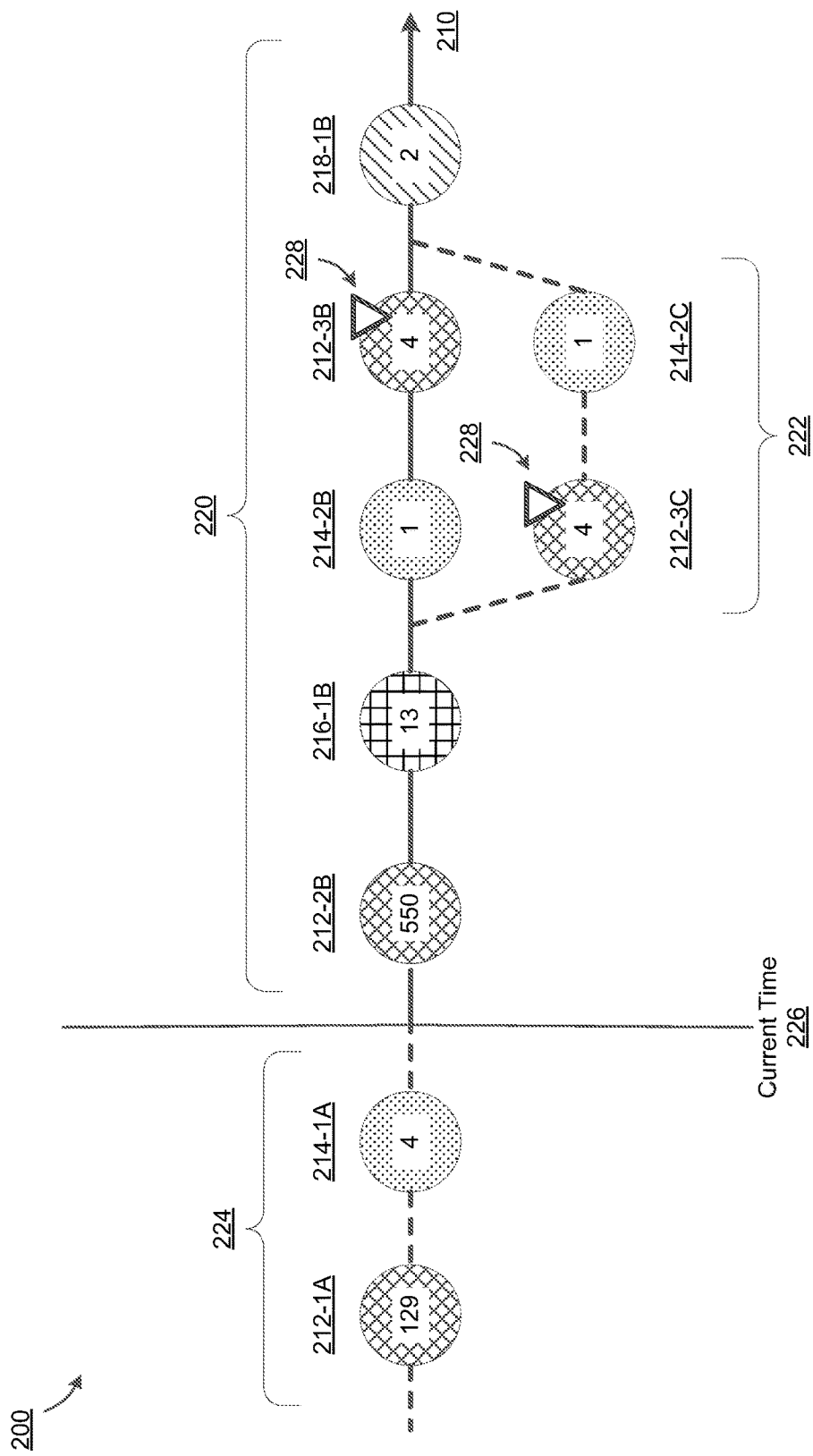
FIG. 2 illustrates an example directed time graph.

Disclosed are systems, methods and computer-readable mediums of timeline resolution paths to view issues affecting network infrastructures. The timeline resolution paths can be suggested paths taken to solve those issues in the most effective way possible, taking into account a number of factors. The issues of the paths can be expanded to view details of the issue(s) which are affecting the device(s) (e.g., server, router, switch, etc.). The details can include issue, error or warning codes, severity, number of devices affected, estimated time to resolve the issues, requirements for resolution, instructions for resolving, etc. Upon completion of an issue (or upon administrator discretion) the path can proceed to the next issue.

Description

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods and non-transitory computer-readable mediums for dynamically presenting and updating a directed time graph displayed in a graphical user interface. In some examples, the method can include displaying a suggested path within a graphical user interface on a computer screen, the suggested path can include outstanding issues corresponding to elements of a network. The displaying the suggested path can include determining based on one or more factors an efficient ordering of the outstanding issues and ordering the outstanding issues based on the one or more factors. The method can also include monitoring, at regular intervals, updates to the one or more outstanding issues and automatically updating the suggested path, by a processor, based on the updates to the one or more outstanding issues.

In some examples, the method can also include the one or more factors of each outstanding issue of the outstanding issues. The factors can include an impact on users of the network, location of a network element (e.g., within the network—core, edge, etc.), a number of network elements affected by the outstanding issue, a severity of the outstanding issues, effort required to resolve the issue, and a length of time to resolve the outstanding issues.

In some examples, each outstanding issue can be independently displayed on the suggested path with a number of network elements affected with the outstanding issue and a severity of the outstanding issue.

In some examples, the method can include an alternate suggested path. The method can display, along with the suggested path, an alternate suggested path within the graphical user interface on the computer screen, the alternate suggested path can include an alternate ordering of the suggested path. In some examples, the alternate ordering is based on an administrator input. In some examples, the alternate ordering is based on one of the outstanding issues affect on network infrastructure.

Figure 1:
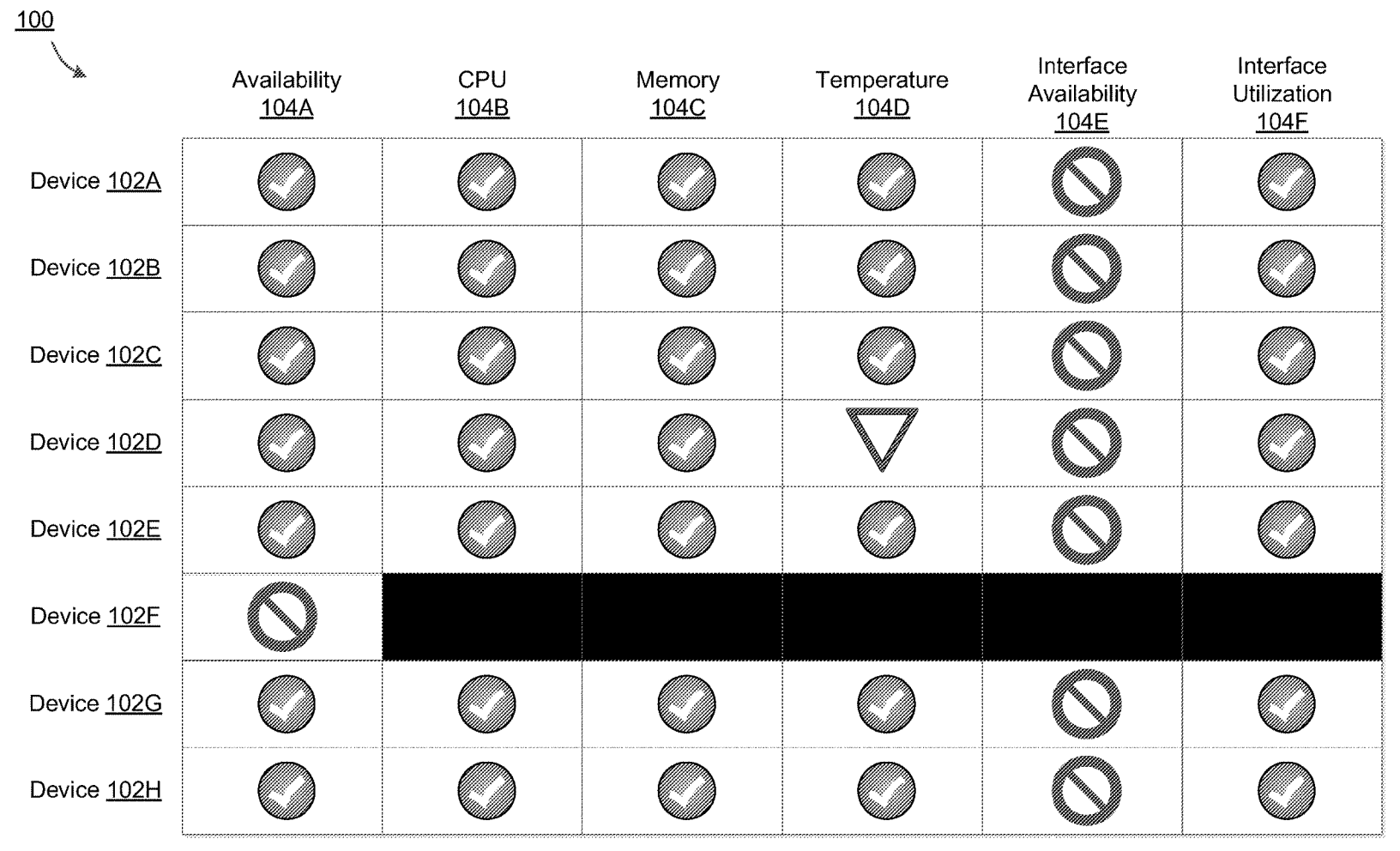

FIG. 1 illustrates a prior art dashboard and visualization for presenting errors, warnings and faults to administrators. Dashboard 100 is presented in a grid format with the vertical axis including devices (e.g., 102A-H) and a horizontal axis including type of report (104A-F). The reporting data from the devices can be Availability (of the device), CPU, Memory, Temperature, Interface Availability, and Interface Utilization. When a device is operating without errors, warnings, or faults the reporting data for that device can be reflected graphically on the dashboard by for example, a check mark and the color green. When a device is operating with warnings the reporting data for that device can be reflected graphically on the dashboard by for example, a yield symbol and the color yellow. When a device is operating with errors or faults the reporting data for that device can be reflected graphically on the dashboard by for example, a stop symbol and the color red. When a device is unavailable (e.g., 102F), no reporting data will be received and the dashboard can be reflected graphically by for example, a blackout out or display nothing.

FIG. 2 illustrates and example directed time graph 200. The directed time graph 200 illustrates a suggested path 210 that can be taken to solve outstanding issues (e.g., errors, warnings, faults, etc.) in an efficient manner, taking into account a number of factors. The factors can include, but are not limited to: severity of the issues, issues that have (or are likely to have) the most impact to the organization, the length of time to resolve the issues (per device and/or per problem type), effort required to resolve the issues, and/or the importance of the issues to an affected device's location in the infrastructure.

Suggested path 210 can be illustrated over a period of time, including past time 224, current time 226, and future time 220. Past time 224 illustrates issues on devices that have been resolved (e.g., 212-1A, 214-1A). Current time 226 illustrates a current location (e.g., starting point for an administrator) in suggested path 210. Future time 220 illustrates issues on devices that need to be resolved (e.g., 212-2B, 216-1B, 214-2B, 212-3B, 218-1B). In some examples, directed time graph 200 can include one or more alternate paths (e.g., 222).

Suggested path 210 (and alternate path 222) can include one or more issues (e.g., 212-1A, 214-1A, 212-2B, etc.). The issues can have different severity levels, which can include, but are not limited to: high (red) severity, high-moderate (orange) severity, moderate (yellow) severity, and/or low (blue) severity. In the example illustrated in FIG. 2 (and for ease of explanation), low severity issues start with 212, high severity issues start with 214, moderate severity issues start with 216, and high-moderate severity issues start with 218. Subsequent to the severity level of an issue is a sequential number (i.e., to show the number of issues with that severity in the path) and a letter (i.e., to show the portion of the path the issue is in). For example, issue 212-1A is a first, low severity issue in the past (A); issue 212-2B is a second, low severity issue in the future suggested path (B); issue 212-3C is a third, and low severity issue in the future alternate path (C); and issue 214-2B is a second, and high severity issue in future suggested path (B). The numbering of the issues is for ease of explanation of the disclosure and is not limiting.

The issues of directed time graph 200 can also include a number displayed within the issue (e.g., 129, 4, 550, 13, 1, 4, 2, etc.) representing the number of devices affected by the issue. In the example illustrated in FIG. 2, 129 devices were affected (and resolved) with a low severity in past path 224 (e.g., 212-1A); 13 devices are affected with a moderate severity issue in future suggested path (e.g., 216-1B); and 1 device is affected with a high severity issue in future alternate path (e.g., 214-2C). In other examples, the number of devices can be displayed in a location proximate the issue.

In some example embodiments, a future alternate path (e.g., 222) can be provided. For example, alternate path (e.g., 222) can be ordered based on prioritizing critical network infrastructure devices with discovered issues, as shown by icon 228 on issue 212-3B (which is the same issue as issue 212-3C, but in a alternate path "C"). For example, issues 212-3B and 214-2B can be re-ordered (as issue 212-3C and 214-2C in path "C") to provide different resolution paths based on one or more factors (e.g., severity, criticality, etc.). For example, the issues can be reordered based on icon 228, which shows issues 212-3B (and 212-3C) are critical to network infrastructure. In other examples, future alternate paths can be determined by administrator preferences. For example, based on quantity of affected devices, criticality of affected devices, etc.

Figure 3:
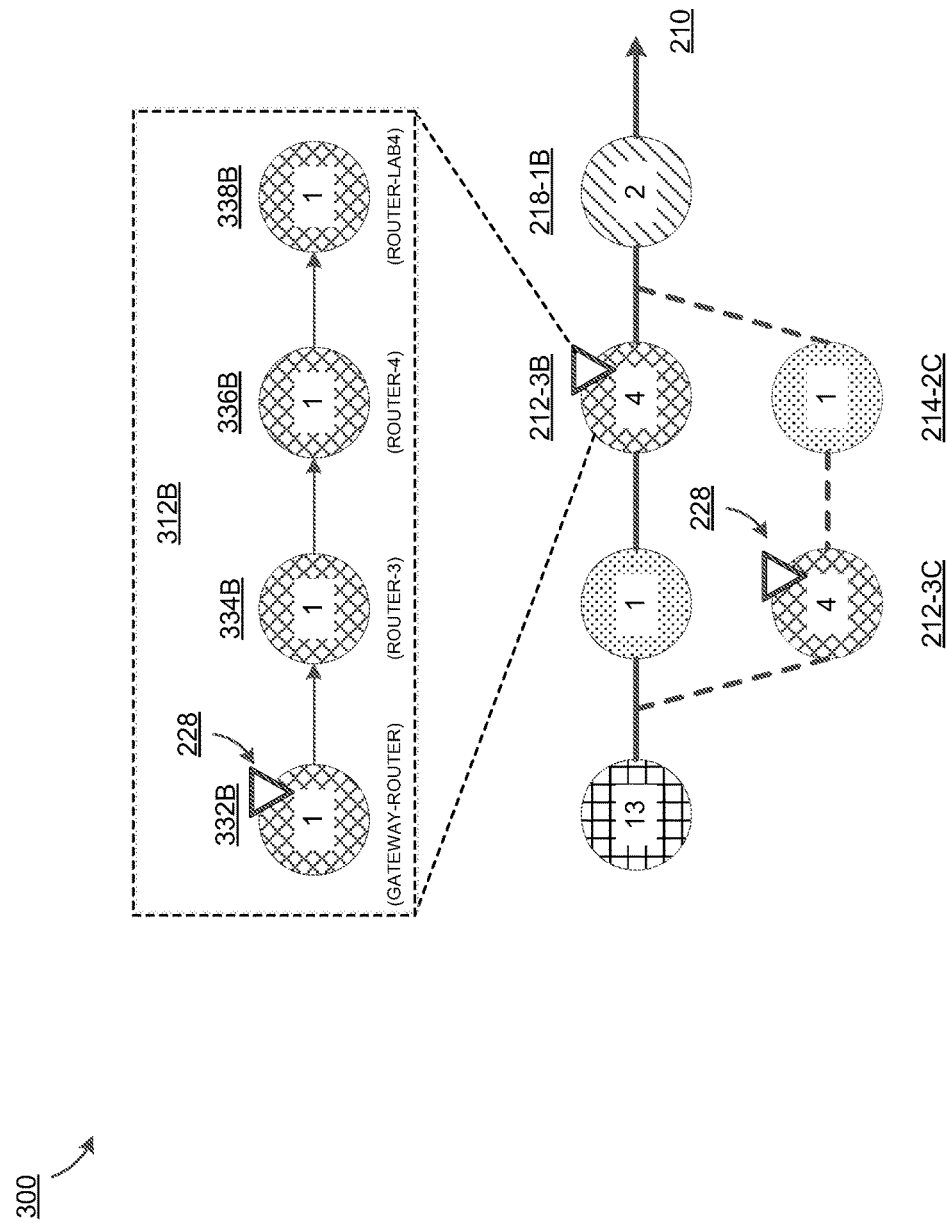
FIG. 3 illustrates an example detailed issue view of an example directed time graph.

FIG. 3 illustrates an example detailed issue view (e.g., 312B) of an example directed time graph 300. Each of the issues (e.g., 212-1A, 214-A, 212-2B, 212-3C, 212-3B, etc.) of time graph 300 can be expanded into a detailed view (e.g., 312B). In some examples, an administrator can select an issue to expand (e.g., view) displaying the detailed view. In some examples, a detailed view is automatically displayed based on the next issue in the time graph or criticality of an affected device in an issue.

Detailed issue view 312B illustrates, separately, the four affected devices (e.g., 332B, 334B, 336B, 338B) of issue 212-3B. In some examples, the detailed view can be of issues that have been resolved (e.g., 212-1A, 214-1A) or issues of an alternative path (e.g., 212-3C, 214-2C). The detailed issue view can include the names and locations of the affected devices, the criticality of the devices (e.g., infrastructure devices, production devices, test devices, lab devices, etc.), estimate time of completion (e.g., per device, total, etc.), and/or suggested order for fixing the affected devices. For example, detailed view 312B suggests first fixing device 332B (of issue 212-3B) (e.g., "gateway-router") because device 332B is critical to the core network infrastructure (as shown by icon 228). In this example, icon 228 flags (and highlights to the administrator) the critical natural of an affected device (e.g., core network infrastructure, etc.). Next detailed view 312B suggests fixing issues 334B and 336B which are both production routers (e.g., router-4, router-5), and then suggests fixing the issue on 338B on a non-production router (e.g., router-lab4). In some examples, the suggested order for addressing the devices (affected with the issue) is based on factors that include, but not limited to: importance of device, location of device within the network, estimate time of completion of each device, etc.

Figure 4:
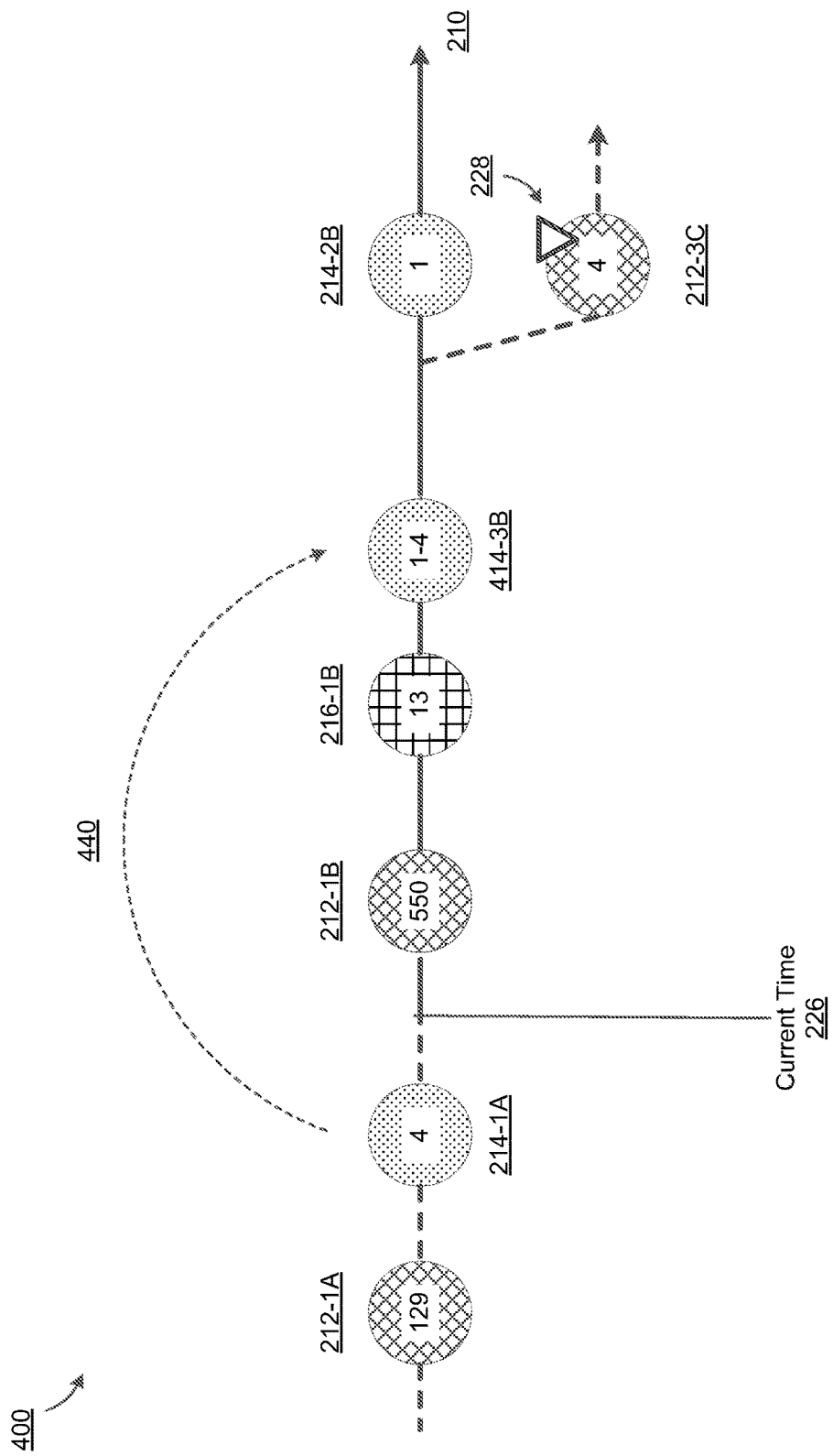
FIG. 4 illustrates an example new issue of an example directed time graph.

FIG. 4 illustrates an example new issue 414-3B of an example directed time graph 400. Issue 214-1A included four (4) devices that were affected by a high severity issue and resolved. Subsequently, issue 414-3B (illustrated by arrow 440) shows a new device (e.g., 1-4) affected by the previously resolved issue 214-1A. For example, four devices at a first time were affected by a high severity issue (e.g., security paths not installed, failed port, etc.) and resolved. At a subsequent second time (after current time 226), another device (i.e., not one of the previous four devices) has become affected by the same high severity issue.

Accordingly, the directed time graph illustrates the issue as reoccurring in a new device, that was previously resolved in the four (4) other devices. In some examples, at the subsequent second time, the another device is one of the previously resolved devices (i.e., the issue that was resolved in four (4) devices has reoccurred in one of those four (4) devices). In some examples, issue 414-3B can include an identifying icon to illustrate the issue as occurred in a new device (and was previously resolved in other devices). In some examples, issue 414-3B can be a new issue, on a new device (or on a device that had a different, previously resolved or still pending issue). In some embodiments, the detailed view can also show other issues affecting each device so an administrator can address all issues of the device at a single time.

Figure 5:
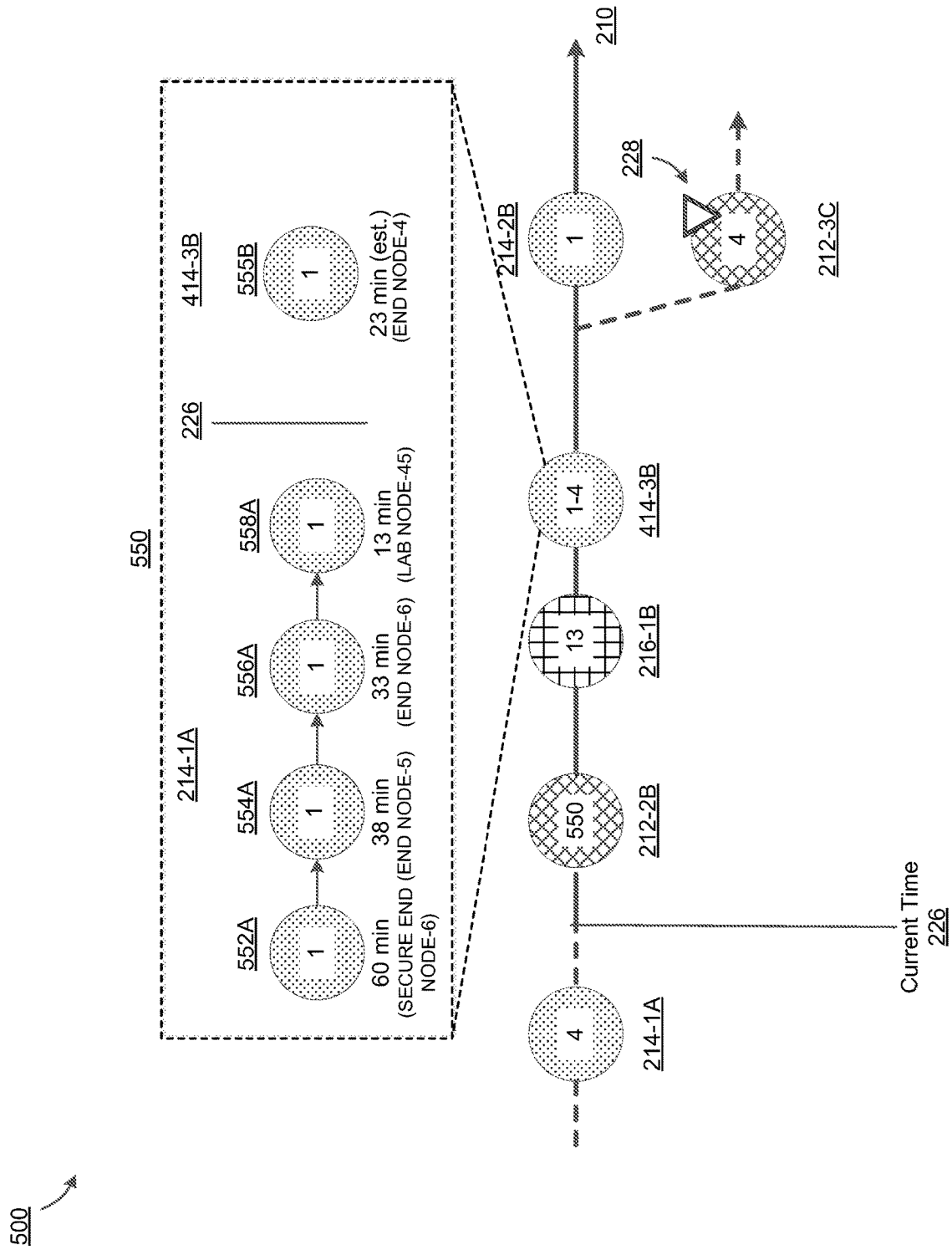
FIG. 5 illustrates an example detailed new issue view of an example directed time graph.

FIG. 5 illustrates an example detailed issue view 550 of an example directed time graph 500. Each of the previously resolved devices (e.g., 552A, 554A, 556A, 558A) with issue 214-1A and the new device (e.g., 555B) with issue 414-3B (i.e., same issue as 214-1A) can be expanded into a detailed view (e.g., 550). In some examples, an administrator can select the issue (from the suggested path) to view the detailed view. In some examples, a detailed view is automatically displayed based on the next issue in the time graph or criticality of an affected device in an issue.

Detailed issue view 550 illustrates, separately, the four (4) previously affected devices (e.g., 552A, 554A, 556A, 558A) of issue 212-1B. The detailed issue view can include the names and locations of the affected devices, the criticality of the devices (e.g., infrastructure devices, production devices, test devices, lab devices, etc.), the approximate time it took to resolve the issue (e.g., per device, total, etc.), and/or order the affected devices were fixed. For example, detailed view 550 shows issue 552A was resolved first in 60 minutes and is a "secure end-node-6," issue 554A was resolved second in 38 minutes and is an "end node-5," issue 556A was resolved third in 33 minutes and is an "end node-6," and issue 558A was resolved last, in 13 minutes and is a "lab node-45."

Next, detailed issue view 550 illustrates subsequently to current time 226, a new device 555B affected with the same issue as previous devices (e.g., 552A, 554A, 556A, 558A). The detailed issue view can include the names and locations of the affected devices, the criticality of the devices (e.g., infrastructure devices, production devices, test devices, lab devices, etc.), estimate time of completion (e.g., per device, total, etc.), and/or suggested order for fixing the affected devices (when there is more than one). For example, detailed issue view 550 of issue 414-3B suggests fixing device 555B which is named "end-node-4" which will take approximately 23 minutes. In some examples, more than one device can be affected and detailed issue view 550 can illustrate a suggested path (e.g., order) and the estimated times of completion for each of the affected devices. After an issue of a device has been resolved (e.g., issue 414-3B of device 555B) current time 226 can move in front of (e.g., to the right of) the newly resolved issue (i.e., illustrating the issue is in the past and has been resolved).

Figure 6:
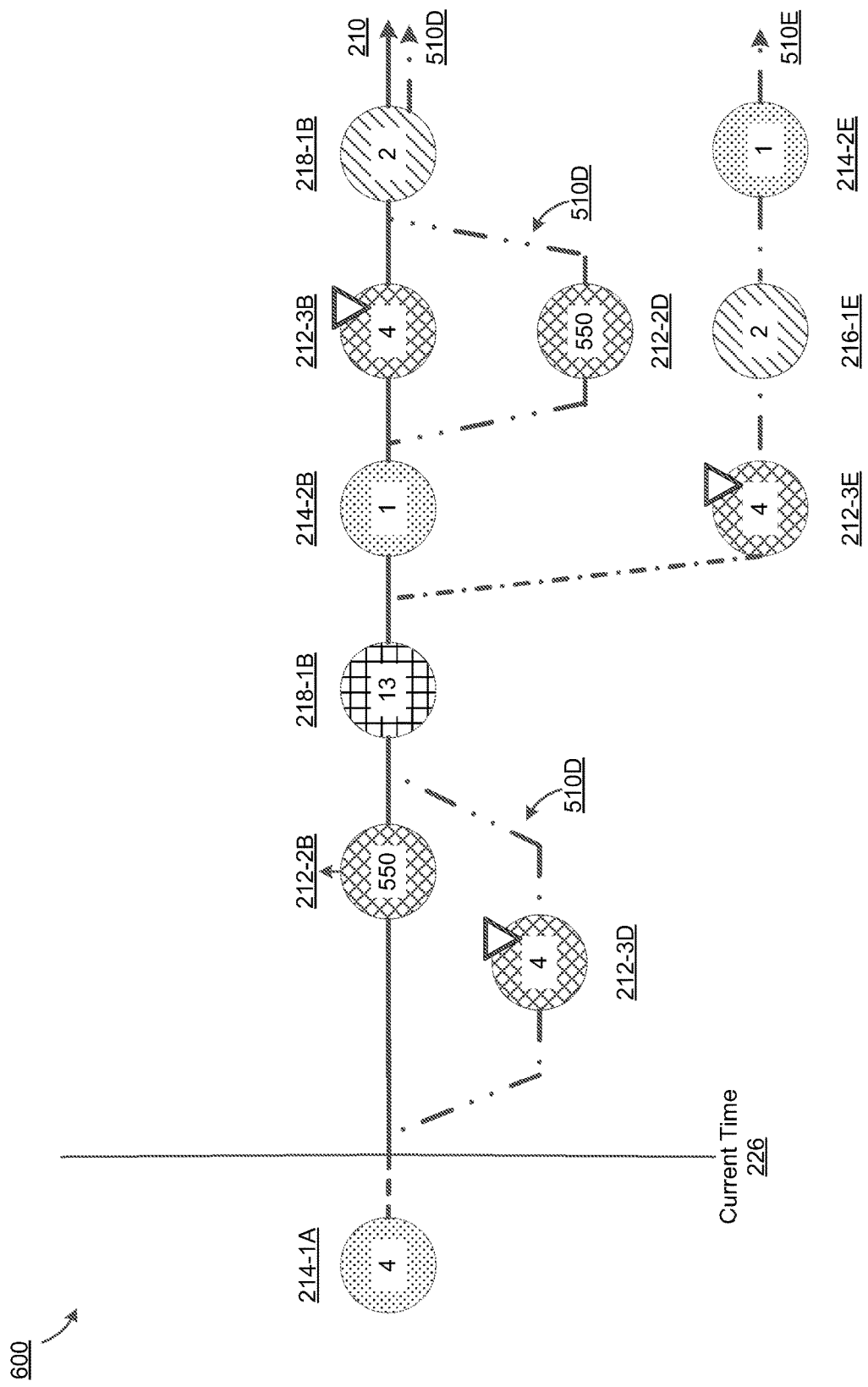
FIG. 6 illustrates an example multipath directed time graph.

FIG. 6 illustrates an example multipath directed time graph 600. Directed time graph 600 can include multiple suggested paths (e.g., 210, 510D, 510E). Each suggested path can include the same issues affecting the same devices, however, in a different order in which the issues should be addressed (and ultimately resolved). For example, suggested path 210 can be determined based on one or more factors including, but not limited to, is the device affected critical to the network infrastructure (e.g., main gateway, etc.), time and/or effort to resolved the issue (e.g., can an issue be resolved quickly, resolving it sooner rather than later could prevent escalation of the issue, etc.), severity of the issue (e.g., the greater the severity the sooner it should be resolved), number of devices affected by the issue (e.g., the greater the number of affected device the sooner they should be addressed—verses a single device), lead times for software resolutions (e.g., when there is no current software fix/patch then the issue cannot be resolved at this time and should not be placed earlier in the suggested path), device utilization (e.g., heavy utilization would likely equate to quicker resolution), and/or sequencing (e.g., underlying knowledge of the network infrastructure enables device relations in order to determine a viable device "order of operation" as to limit potential network outages when devices are taken out of server to resolved issues—for example, an upgrade).

Suggested path 510D can provide more weight to the criticality of the issues affecting the devices. For example, issue 212-3D (i.e., 212-3B in suggested path 210) affecting four (4) devices (one of which is a device with critical functions) is closer to the current time 226 than issue 212-2D (i.e., 212-2B in suggested path 210) of similar severity affecting 550 devices. Suggested path 510E can give more weight to the quantity of devices affected by the issue. For example, the issues are ordered by number of device affected, 550 devices (e.g., 212-2B), 13 devices (e.g., 218-1B), 4 devices (e.g., 212-3E), 2 device (e.g., 216-1E) and 1 device (e.g., 214-2E).

Figure 7A:
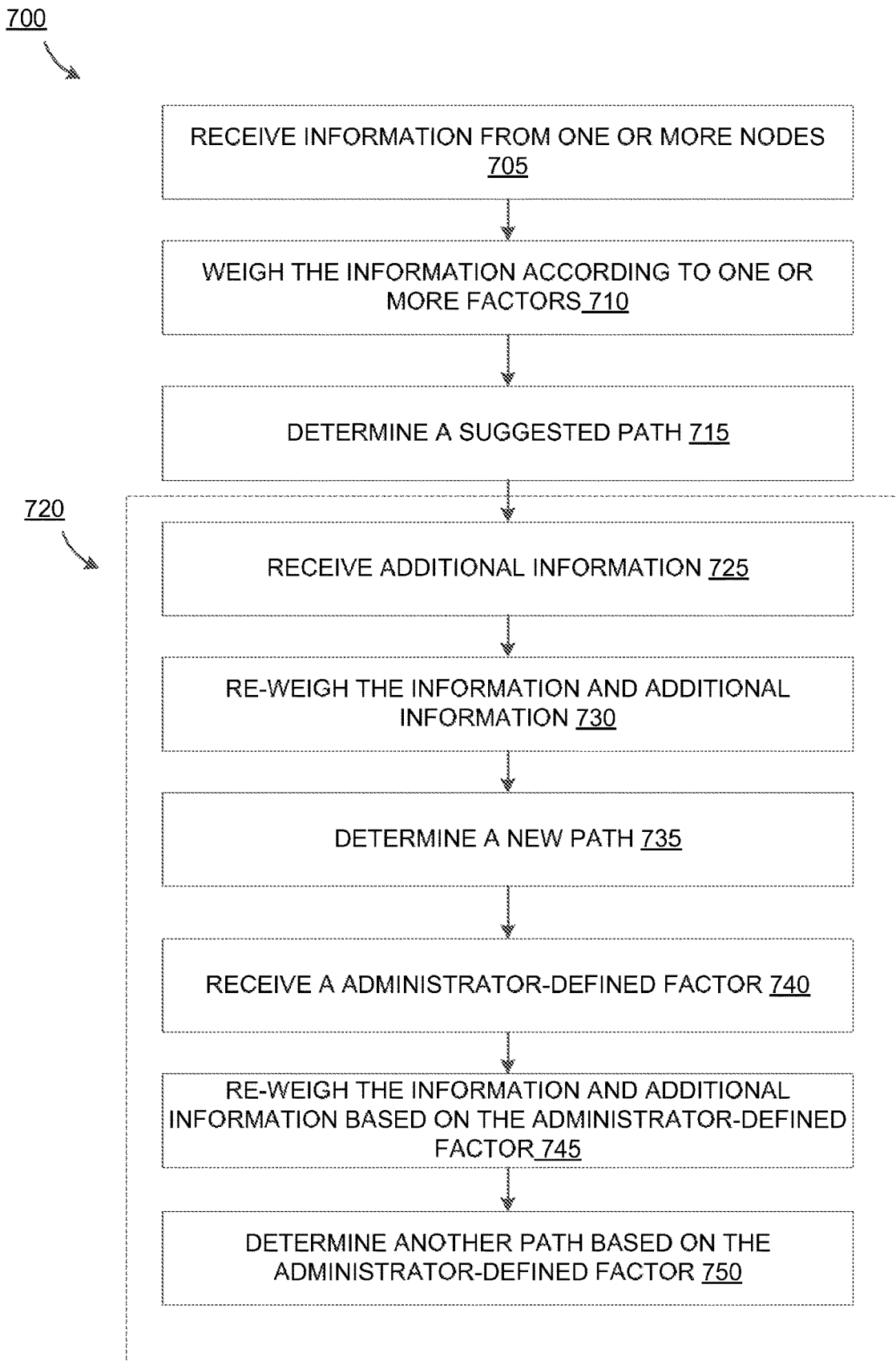

FIG. 7A illustrates an example method 700 of determining a directed time graph. The method shown in FIG. 7A is provided by way of example, as there are a variety of ways to carry out the method. Additionally, while the example method is illustrated with a particular order of sequences, those of ordinary skill in the art will appreciate that FIG. 7A and the sequences shown therein can be executed in any order that accomplishes the technical advantages of the present disclosure and can include fewer or more sequences than illustrated.

Each sequence shown in FIG. 7A represents one or more processes, methods or subroutines, carried out in the example method. The sequences shown in FIG. 7A can be implemented on a device illustrated in FIGS. 8A and 8B operating in a network infrastructure including a plurality of components (e.g., routers, switches, servers, etc.). The flow chart illustrated in FIG. 7A will be described in relation to and make reference to at least the devices of FIGS. 8A and 8B and the issues and devices described in FIG. 2-6.

Method 700 can begin at block 705. At block 705, a server can obtain information from one or more nodes (e.g., router, gateway, server, switch, etc.). The one or more nodes can be devices in one or more network infrastructures. The server (or application running on a physical or virtual server) can process the obtained information, in order to determine if there are any issues discovered in the information received. The issues can include, but not be limited to: errors, faults, warnings, statuses, updates, availability, utilization, temperature, component statuses (e.g., processing, memory, port, motherboard, power, etc.), etc. When the server has obtained information from one or more nodes, method 700 can proceed to block 710.

At block 710, the server can weigh the information according to one or more factors. The one or more factors can include, but are not limited to: is the device affected critical to the network infrastructure (e.g., main gateway, etc.), time and/or effort to resolved the issue (e.g., when an issue can be resolved quickly, resolving it sooner rather than later could prevent escalation of the issue), severity of the issue (e.g., the greater the severity the sooner it should be resolved), number of devices affected by the issue (e.g., the greater the number of affected device the sooner they should be addressed—verses a single device), lead times for software resolutions (e.g., when there is no current software fix/patch then the issue cannot be resolved at this time and should not be placed earlier in the suggested path), device utilization (e.g., heavy utilization would likely equate to quicker resolution), and/or sequencing (e.g., underlying knowledge of the network infrastructure enables device relations in order to determine a viable device "order of operation" as to limit potential network outages when devices are taken out of server to resolved issues—for example, an upgrade). When the server has given weight to the information, method 700 can proceed to block 715.

At block 715, the server can generate a suggested path. The suggested path can be a directed time graph as shown in FIG. 2-6. The suggested path can be based on the weighed information received from the one or more nodes. The suggested path can be rendered as a graphical user interface and displayed to an administrator(s). The suggested path can be a directed time graph suggesting a path the administrator should take in resolving the issues in the network infrastructure. When the suggested path has been determined method 700 can end.

Method 720 can continue from block 715 of method 700. At block 725, the server can receive additional information from the one or more nodes, or from one or more additional nodes. In some examples, this additional information can be processed by issue detection rule(s) (e.g., applications, software, method, etc.) configured to detect newly discovered issues (e.g., that were previously unable to be detected). In some examples, the additional information can include previously received information (from issues that have not been resolved). In some examples, the additional information can include new information that includes, but is not limited to: errors, faults, warnings, statuses, updates, availability, utilization, temperature, component statuses (e.g., processing, memory, port, motherboard, power, etc.), etc. When additional information has been received, method 720 can proceed to block 730.

At block 730, the additional information can be weighted. In some examples, the additional information can be weighted along with the previously received information (e.g., from block 710). In some examples, all received information (e.g., at block 710 and 730) can be weighted together. When the information has been weighted, method 720 can proceed to block 735.

At block 735, the server can determine a new suggested path. For example, the additional weighted information and the previous weighted information can be combined to form a new suggested path to resolve the issues from the received information (and received additional information). In some examples, the new path can be a recalculation of the paths (e.g., suggested, alternate, etc.). For example, based on the additional weighted information and previous weighted information. In some examples, new issues (e.g., determined at block 735) can be included in various places of the suggested path (e.g., determined at block 715) and can based on the weighed information and additional information creating a new suggested path. The new suggested path can be rendered as a graphical user interface and displayed to an administrator(s). In some examples, the suggested path can be updated (e.g., by recalculating the suggested path based on the additional information), and the update is rendered as a graphical user interface and displayed to an administrator(s). In some examples, the new suggested path can be calculated at predetermined intervals (e.g., daily, weekly, monthly, etc.) When the new suggested path has been determined, method 720 can proceed to block 740.

At block 740, the server can receive one or more administrator defined factors. The administrator defined factors can include, but are not limited to: quantity (e.g., number of device affected), criticality (e.g., issues affected devices critical to infrastructure), and severity (e.g., issues of high severity verse issues of low severity). When administrator defined factors have been received method 720 can proceed to block 745.

At block 745, the server can re-weight the information received based on the administrator defined factors. For example, when an administrator defined factor of quantity is received, the information received can be re-weighted to given more weight to issues affecting a greater number of devices. When the information has been re-weighted, method 720 can proceed to block 750.

At block 750, the server can determined another suggested path based on the one or more administrator(s) defined factors. For example, an alternate path 510E (as shown in FIG. 6) can be determined based on the quantity factor received from an administrator(s). In another example, an alternate path 510D can be determined based on the criticality factor received from an administrator(s). The alternate suggested path(s) can be rendered as a graphical user interface and displayed to an administrator(s). The alternate path(s) can be a directed time graph suggesting a path the administrator (based on administrator defined factors) should take in resolving the issues in the network infrastructure. When the alternate path(s) have been determined method 720 can end.

FIG. 7B illustrates an example method 775 of determining a directed time graph. The method shown in FIG. 7B is provided by way of example, as there are a variety of ways to carry out the method. Additionally, while the example method is illustrated with a particular order of sequences, those of ordinary skill in the art will appreciate that FIG. 7B and the sequences shown therein can be executed in any order that accomplishes the technical advantages of the present disclosure and can include fewer or more sequences than illustrated.

Each sequence shown in FIG. 7B represents one or more processes, methods or subroutines, carried out in the example method. The sequences shown in FIG. 7B can be implemented on a device illustrated in FIGS. 8A and 8B operating in a network infrastructure including a plurality of components (e.g., routers, switches, servers, etc.). The flow chart illustrated in FIG. 7B will be described in relation to and make reference to at least the devices of FIGS. 8A and 8B and the issues and devices described in FIG. 2-6.

Method 770 can begin at step 775. At step 775 a processor (e.g., 810) can display a suggested path within a graphical user interface on a computer screen (e.g., 835), the suggested path comprising issues of nodes/devices (e.g., network elements) of a network.

At step 780, the processor can monitor, at regular intervals, updates to the one or more outstanding issues. In some examples, the processor can monitor for new outstanding issues and add the new outstanding issues to the suggested path. In some examples, the updates can be determined based on newly implemented issue detection rule(s) (e.g., applications, software, method, etc.) configured to detect new issues (e.g., that were previously unable to be detected). In some examples, the processor can monitor for resolved outstanding issues and in response adjust the current time indicator (e.g., 226) to reflect the resolved outstanding issues.

At step 785, the processor can automatically update the suggested path, based on the updates to the one or more outstanding issues. For examples, add or update outstanding issues, adjust the current time indicator (e.g., 226), etc.

Figure 8B:
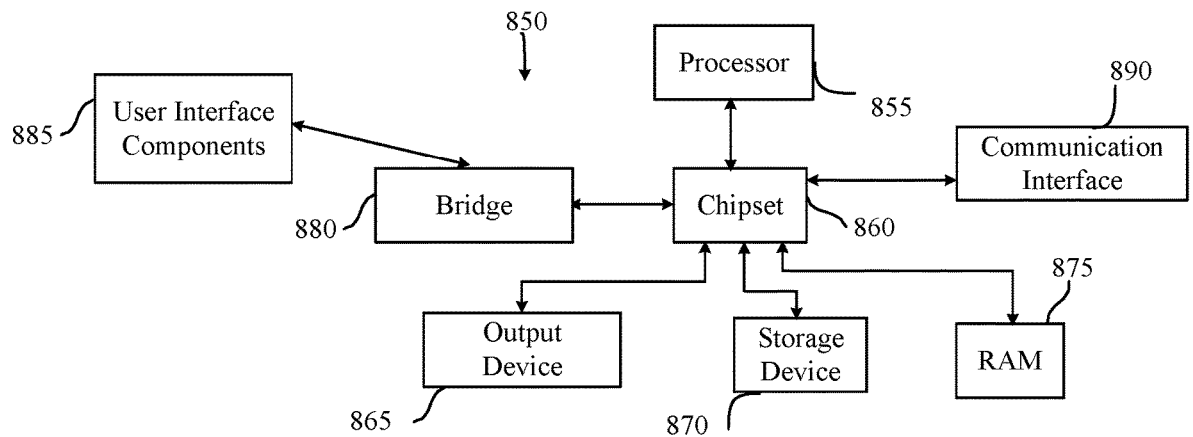
FIGS. 8A and 8B illustrate example system embodiments.
Figure 8A:
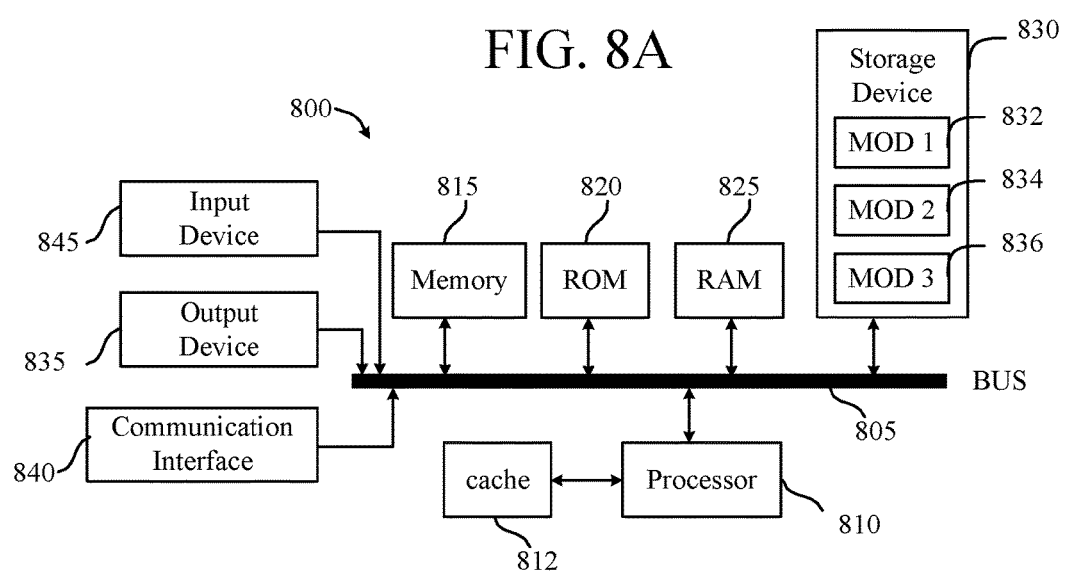

FIG. 8A and FIG. 8B show exemplary possible system embodiments. The more appropriate embodiment will be apparent to those of ordinary skill in the art when practicing the present technology. Persons of ordinary skill in the art will also readily appreciate that other system embodiments are possible.

FIG. 8A illustrates a conventional system bus computing system architecture 800 wherein the components of the system are in electrical communication with each other using a bus 80. Exemplary computing system 800 includes a processing unit (CPU or processor) 810 and a system bus 805 that couples various system components including the system memory 815, such as read only memory (ROM) 820 and random access memory (RAM) 825, to the processor 810. The system 800 can include a cache of high-speed memory connected directly with, in close proximity to, or integrated as part of the processor 810. The system 800 can copy data from the memory 815 and/or the storage device 830 to the cache 812 for quick access by the processor 810. In this way, the cache can provide a performance boost that avoids processor 810 delays while waiting for data. These and other modules can control or be configured to control the processor 810 to perform various actions. Other system memory 815 may be available for use as well. The memory 815 can include multiple different types of memory with different performance characteristics. The processor 810 can include any general purpose processor and a hardware module or software module, such as module 1 832, module 2 834, and module 3 836 stored in storage device 830, configured to control the processor 810 as well as a special-purpose processor where software instructions are incorporated into the actual processor design. The processor 810 may essentially be a completely self-contained computing system, containing multiple cores or processors, a bus, memory controller, cache, etc. A multi-core processor may be symmetric or asymmetric.

To enable user interaction with the computing system 800, an input device 845 can represent any number of input mechanisms, such as a microphone for speech, a touch-sensitive screen for gesture or graphical input, keyboard, mouse, motion input, speech and so forth. An output device 835 can also be one or more of a number of output mechanisms known to those of skill in the art. In some instances, multimodal systems can enable a user to provide multiple types of input to communicate with the computing system 800. The communications interface 840 can generally govern and manage the user input and system output. There is no restriction on operating on any particular hardware arrangement and therefore the basic features here may easily be substituted for improved hardware or firmware arrangements as they are developed.

Storage device 830 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 825, read only memory (ROM) 820, and hybrids thereof.

The storage device 830 can include software modules 832, 834, 836 for controlling the processor 810. Other hardware or software modules are contemplated. The storage device 830 can be connected to the system bus 805. In one aspect, a hardware module that performs a particular function can include the software component stored in a computer-readable medium in connection with the necessary hardware components, such as the processor 810, bus 805, display 835, and so forth, to carry out the function.

FIG. 8B illustrates a computer system 850 having a chipset architecture that can be used in executing the described method and generating and displaying a graphical user interface (GUI). Computer system 850 is an example of computer hardware, software, and firmware that can be used to implement the disclosed technology. System 850 can include a processor 855, representative of any number of physically and/or logically distinct resources capable of executing software, firmware, and hardware configured to perform identified computations. Processor 855 can communicate with a chipset 860 that can control input to and output from processor 855. In this example, chipset 860 outputs information to output 865, such as a display, and can read and write information to storage device 870, which can include magnetic media, and solid state media, for example. Chipset 860 can also read data from and write data to RAM 875. A bridge 880 for interfacing with a variety of user interface components 885 can be provided for interfacing with chipset 860. Such user interface components 885 can include a keyboard, a microphone, touch detection and processing circuitry, a pointing device, such as a mouse, and so on. In general, inputs to system 850 can come from any of a variety of sources, machine generated and/or human generated.

Chipset 860 can also interface with one or more communication interfaces 890 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 855 analyzing data stored in storage 870 or 875. Further, the machine can receive inputs from a user via user interface components 885 and execute appropriate functions, such as browsing functions by interpreting these inputs using processor 855.

It can be appreciated that exemplary systems 800 and 850 can have more than one processor 810 or be part of a group or cluster of computing devices networked together to provide greater processing capability.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

A "server" can be any physical or virtual computer systems running one or more services or applications, to serve the requests of other computers or electronic devices on a communications network. Such servers can include, but are not limited to: application servers, cloud servers, web servers, database servers, file servers, communications servers, proxy servers, name servers, home servers, fax servers, mail servers, print servers, game servers, routers, switches, or any other type of suitable server. An application server can be dedicated to running certain software applications. The physical server can be a rack server, tower server, miniature server, home server, mini rack server, blade server, or any other type of server. A cloud server can be computing resources are dynamically provisioned and allocated on-demand from a collection of resources available via the network (e.g., "the cloud"). Cloud computing resources can include any type of resource such as computing, storage, network devices, virtual machines (VMs), etc. The server can have the following hardware, one or more central processing units (CPU), one or more of a memory, one or more of a power supply, one or more of a bus, one or more of a network module (such as, LAN module, Ethernet module, Wireless Fidelity module (Wi-Fi), location module (GPS)), one or more of a cooling system (such as, air conditioning, ventilations, fan system). The server can run the following Operating System (OS) software, Windows, UNIX, Linux, OSX, or any other suitable Operating System. The server can also run one or more server software programs, depending on the type of server, such as, application software (Java™, .NET Framework™, or software specific to the application begin hosted on the server), web server software (Apache™ or Internet Information Services IIS™), database software applications (Oracle MySQL™, Sybase™, or any other database software), or any other type of server software programs.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

What is claimed is:

1. A computer-implemented method for dynamically presenting and updating a directed time graph, the method comprising:
   receiving information from a plurality of network elements;
   identifying issues with the network information;
   first displaying, by a processor, a time graph of a suggested path of a sequence of steps within a graphical user interface, each of the steps comprising one or more outstanding issues corresponding to elements of a network that need to be resolved and the sequence of steps comprising an order in which the outstanding issues are to be resolved;
   second displaying, by the processor, for one of the steps and in response to predetermined criteria, an order in which the elements of the network are to be repaired to address the one or more outstanding issues of the one of the steps; and
   third displaying by the processor, along with the suggested path, one or more alternate suggested paths within the graphical user interface on the display, the one or more alternate suggested paths comprising alternate orderings of the suggested path;
   monitoring, at regular intervals by the processor, updates to the one or more outstanding issues; and
   automatically updating, by the processor, the displayed suggested path based on the updates to the one or more outstanding issues.

2. The computer-implemented method of claim 1, wherein displaying the suggested path comprises:
   determining based on one or more factors an efficient ordering of the outstanding issues; and
   ordering the outstanding issues based on the one or more factors.

3. The computer-implemented method of claim 2, wherein the one or more factors of each outstanding issue of the outstanding issues comprises an impact on at least one of: one or more users of the network, location of at least one element within the network, a number of elements affected by the outstanding issue, a severity of the outstanding issues, effort required to resolve the outstanding issue, or a length of time to resolve the outstanding issues.

4. The computer-implemented method of claim 1, wherein the first displaying displays each outstanding issue independently on the suggested path with a number of elements affected with the outstanding issue and a severity of the outstanding issue.

5. The computer-implemented method of claim 1, wherein the first displaying displays each outstanding issue independently on the suggested path with a severity of the outstanding issue.

6. The computer-implemented method of claim 1, wherein the predetermined criteria of the second displaying includes user selection of the one of the steps.

7. The computer-implemented method of claim 1, wherein the predetermined criteria of the second displaying includes criticality of an affected device of the one of the steps.

8. A system for displaying a graphical user interface, the system comprising:
a processor; and
a memory storing instructions which when executed by the processor causes the processor to execute operations comprising:
receiving information from a plurality of network elements;
identifying issues with the network information;
first displaying a time graph of a suggested path of a sequence of steps within a graphical user interface, each of the steps comprising one or more outstanding issues corresponding to elements of a network that need to be resolved and the sequence of steps comprising an order in which the outstanding issues are to be resolved;
second displaying for one of the steps and in response to predetermined criteria, an order in which the elements of the network are to be repaired to address the one or more outstanding issues of the one of the steps; and
third displaying, along with the suggested path, one or more alternate suggested paths within the graphical user interface on the display, the one or more alternate suggested paths comprising alternate orderings of the suggested path;
monitoring, at regular intervals by the processor, updates to the one or more outstanding issues; and
automatically updating the displayed suggested path based on the updates to the one or more outstanding issues.

9. The system of claim 8, wherein displaying the suggested path comprises:
determining based on one or more factors an efficient ordering of the outstanding issues; and
ordering the outstanding issues based on the one or more factors.

10. The system of claim 9, wherein the one or more factors of each outstanding issue of the outstanding issues comprises an impact on at least one of: one or more users of the network, location of at least one element within the network, a number of elements affected by the outstanding issue, a severity of the outstanding issues, effort required to resolve the outstanding issue, or a length of time to resolve the outstanding issues.

11. The system of claim 8, wherein the first displaying displays each outstanding issue independently on the suggested path with a number of elements affected with the outstanding issue and a severity of the outstanding issue.

12. The system of claim 8, wherein the first displaying displays each outstanding issue independently on the suggested path with a severity of the outstanding issue.

13. The system of claim 8, wherein the predetermined criteria of the second displaying includes user selection of the one of the steps.

14. The system of claim 8, wherein the predetermined criteria of the second displaying includes criticality of an affected device of the one of the steps.

15. A non-transitory computer readable media storing instructions therein which when executed by a processor cause a system to perform operations comprising:
receiving information from a plurality of network elements;
identifying issues with the network information;
first displaying a time graph of a suggested path of a sequence of steps within a graphical user interface, each of the steps comprising one or more outstanding issues corresponding to elements of a network that need to be resolved and the sequence of steps comprising an order in which the outstanding issues are to be resolved;
second displaying for one of the steps and in response to predetermined criteria, an order in which the elements of the network are to be repaired to address the one or more outstanding issues of the one of the steps; and
third displaying, along with the suggested path, one or more alternate suggested paths within the graphical user interface on the display, the one or more alternate suggested paths comprising alternate orderings of the suggested path;
monitoring, at regular intervals by the processor, updates to the one or more outstanding issues; and
automatically updating the displayed suggested path based on the updates to the one or more outstanding issues.

16. The media of claim 15, wherein displaying the suggested path comprises:
determining based on one or more factors an efficient ordering of the outstanding issues; and
ordering the outstanding issues based on the one or more factors.

17. The media of claim 16, wherein the one or more factors of each outstanding issue of the outstanding issues comprises an impact on at least one of: one or more users of the network, location of at least one element within the network, a number of elements affected by the outstanding issue, a severity of the outstanding issues, effort required to resolve the outstanding issue, or a length of time to resolve the outstanding issues.

18. The media of claim 15, wherein the first displaying displays each outstanding issue independently on the suggested path with a number of elements affected with the outstanding issue and a severity of the outstanding issue.

19. The media of claim 15, wherein the first displaying displays each outstanding issue independently on the suggested path with a severity of the outstanding issue.

20. The media of claim 15, wherein the predetermined criteria of the second displaying includes user selection of the one of the steps.

* * * * *